US007321297B2

(12) United States Patent
Huang

(10) Patent No.: US 7,321,297 B2

(45) Date of Patent: Jan. 22, 2008

(54) PROPERTY SUPERVISORY CONTROL SYSTEM

(76) Inventor: Dennis Huang, 1 Fl., No. 1, Lane 9, Ningpo E. St., Taipei (TW)

( * ) Notice: Subject to any disclaimer, the term of this patent is extended or adjusted under 35 U.S.C. 154(b) by 250 days.

(21) Appl. No.: 11/218,581

(22) Filed: Sep. 6, 2005

(65) Prior Publication Data

US 2006/0255928 A1 Nov. 16, 2006

(30) Foreign Application Priority Data

May 13, 2005 (TW) ............................. 94207781 U
Jun. 13, 2005 (TW) ............................. 94209842 U

(51) Int. Cl.
*G08B 29/00* (2006.01)
*H04Q 7/00* (2006.01)
*H04N 7/18* (2006.01)

(52) U.S. Cl. .............. 340/506; 340/539.25; 340/539.1; 340/539.21; 348/152

(58) Field of Classification Search ................ 340/506, 340/539.25; 348/143
See application file for complete search history.

(56) References Cited

U.S. PATENT DOCUMENTS

| | | | | |
|---|---|---|---|---|
| 6,747,554 | B1 * | 6/2004 | Higashimura et al. | 340/506 |
| 6,907,387 | B1 * | 6/2005 | Reardon | 702/188 |
| 6,975,220 | B1 * | 12/2005 | Foodman et al. | 340/531 |
| 6,977,585 | B2 * | 12/2005 | Falk et al. | 340/506 |
| 7,046,273 | B2 * | 5/2006 | Suzuki | 348/157 |
| 7,158,026 | B2 * | 1/2007 | Feldkamp et al. | 340/531 |
| 7,215,795 | B2 * | 5/2007 | Ito et al. | 382/103 |
| 2002/0063777 | A1 * | 5/2002 | Maekawa et al. | 348/143 |

* cited by examiner

*Primary Examiner*—Donnie L. Crosland
(74) *Attorney, Agent, or Firm*—Bacon & Thomas PLLC

(57) ABSTRACT

The present invention relates to a property supervisory control system. The property supervisory control system operates with an image-capturing device, combines, and outputs a warning signal and image record by the image-capturing device to a supervisory control center. The security service personnel in the supervisory control center can be notified with the type of an object and a displacement of the object by the property supervisory control system when the object is moved abnormally in a scanning region of a wireless receiver. Because the wireless emitter transmits signals only when the object is moved, the power life of the battery of the wireless emitter could be extended.

11 Claims, 8 Drawing Sheets

PROPERTY SUPERVISORY CONTROL SYSTEM

BACKGROUND OF THE INVENTION

1. Field of the Invention

The present invention generally relates to a property supervisory control system and, more particularly, to a property supervisory control system operating with an image capturing device for combining and outputting a warning signal and image record by the image capturing device to a supervisory control center.

2. Description of the Related Art

Conventionally, a burglar alarm includes a signal emitter and an alarm, wherein the signal emitter is attached to an object, and the alarm is positioned at an entrance to detect whether the object attached the signal emitter is passing the entrance. Theoretically, the burglar alarm is capable of preventing the object from being stolen, however, a lot of inconvenience exists. For example, if a thief does not pass through the entrance or the signal emitter is out of power, the alarm cannot work normally and cannot detect whether the object is brought out. In addition, the alarm only is not enough to hold thieves back. Hence, there is a need to improve the conventional burglar alarm.

Another conventional burglar alarm includes a signal emitter and an alarm. The emitter can be taken with a user, and the alarm includes a buzzer and a switch to control the alarm. When the distance between the signal emitter and the alarm is longer than a predetermined distance, the alarm rings. A disadvantage of the conventional burglar is the switch which may be turned off by a thief. When the alarm is turned off, the user may not know his/her property is being stolen.

Furthermore, a monitor is suitable for security service personnel to observe the condition of the property, but the security service personnel may not recognize all of the property. For example, during an exhibition in a museum or a gallery, the security service personnel watching the monitor may only notice that one or more objects have disappeared, but the monitor is not capable of starting an alarm to warm the security service personnel when a thief is trying to bring the object out. If the security service personnel cannot always keep their eyes on the monitor, the property cannot be efficiently controlled and protected from being stolen.

There is thus a general need for improving a property supervisory control system.

SUMMARY OF THE INVENTION

The present invention is a property supervisory control system which operates with an image capturing device, and combines and outputs a warning signal and image record by the image capturing device to a supervisory control center. The property supervisory control system includes a wireless emitter and a signal processor, wherein the wireless emitter is attached to an object. The wireless emitter includes a displacement detector, an encoder, an emitting circuit, and a power supply, wherein the encoder defines a code name of the object. When the object is moved, the displacement detector is started, and the power supply drives the encoder to output the code named by the emitting circuit. The signal processor includes a wireless receiver, a central processor, and an image synthesizer, wherein the wireless receiver includes a receiving circuit to receive the code name from the wireless emitter and a decoder to decode the code name. The central processor receives the code name decoded by the decoder and transmits a warning command according to the code name decoded by the decoder. The image synthesizer receives the image from the image capturing device and the warning command from the central processor. The image synthesizer includes a command decoder, an image counter, an image memory, an alphascope, and a synthesizer, wherein the command decoder unscrambles the warning command. The alphascope generates a text according to the warning command unscrambled by the command decoder. The image counter records the text including a coordinates value displayed in the image memory. The synthesizer generates a combination image of the text and the image recorded by the image capturing device according to the coordinate value in the text and transmits the combination image to the supervisory control center. As mentioned above, the security service personnel can be notified with the code name and the displacement of the object by the property supervisory control system when the object is moved abnormally in the scanning region of the wireless receiver. The property supervisory control system in the present invention is capable of being implanted in a network system with an image capturing device to immediately and efficiently control and protect the property without purchasing new image capturing devices.

Moreover, because the wireless emitter transmits signals only when the object is moved, the power life of the battery of the wireless emitter could be extended.

In addition, the property supervisory control system further includes an alarm checking device disposed in the supervisory control center for receiving the combination image. The alarm checking device includes a signal synchronizing separator, a position converter, and a central processor, wherein the central processor transmits an alarm signal to start an alarm when the central processor determines an usual condition by the signal synchronizing separator and the position converter inspects and regards the combination image as an unusual condition. Therefore, the property supervisory control system can help the security service personnel to observe the property and notify the security service that the object may have been moved. Thus, the property supervisory control system could be more practical.

It is to be understood that both the foregoing general description and the following detailed description are exemplary and explanatory only and are not restrictive of the present invention, as claimed.

The accompanying drawings, which are incorporated in and constitute a part of this specification, illustrate several embodiments of the present invention and together with the description, serve to explain the principles of the present invention.

DETAILED DESCRIPTION OF THE PREFERRED EMBODIMENT

Figure 1:
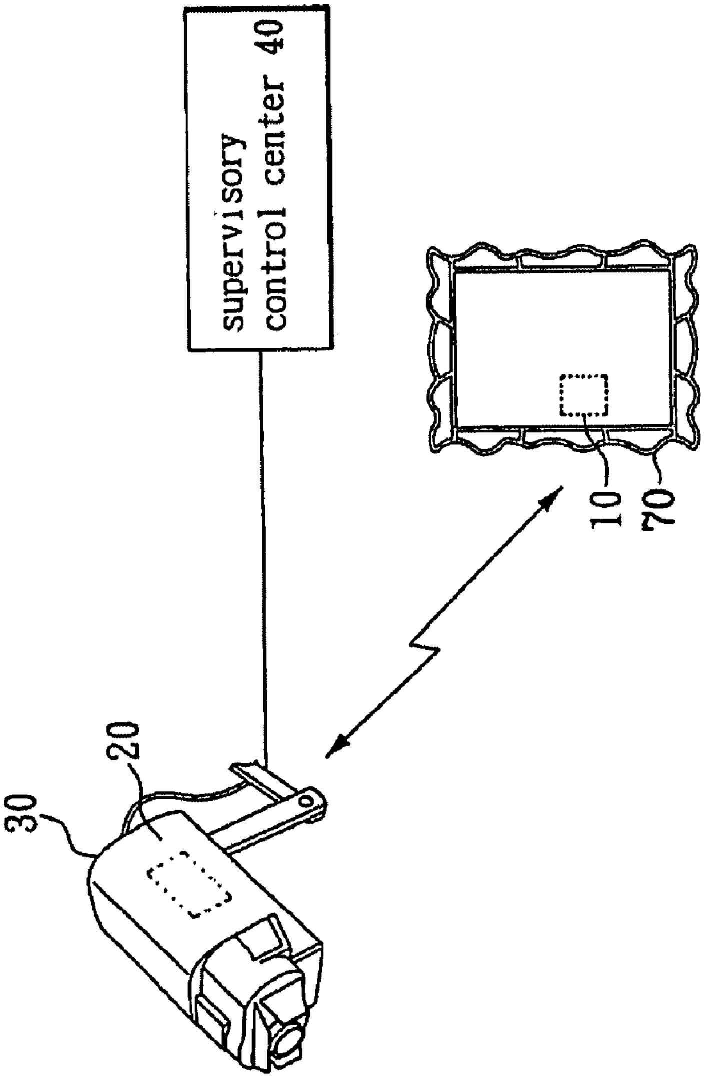
FIG. 1 shows an operating environment of a property supervisory control system of an embodiment of the present invention.
Figure 2:
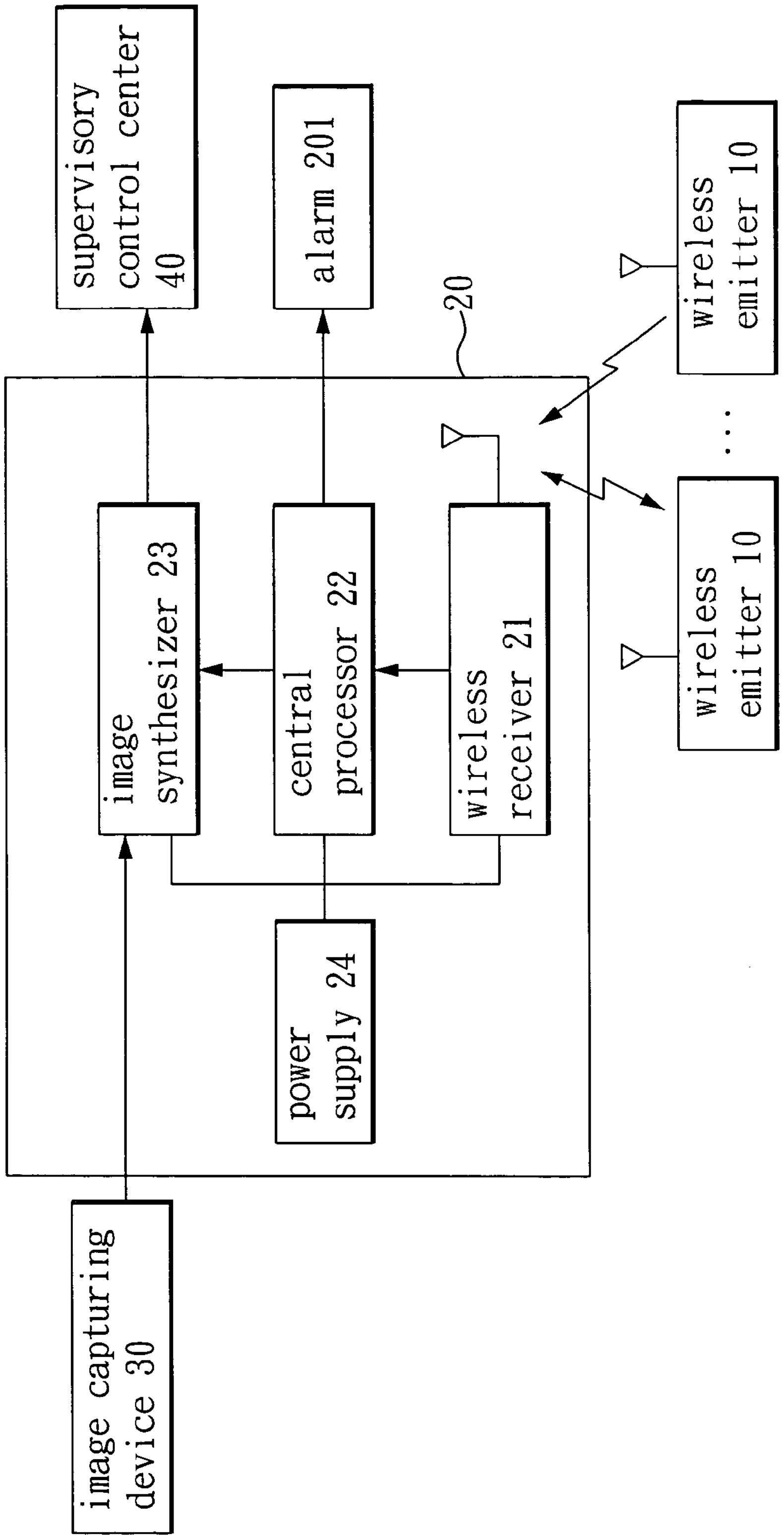
FIG. 2 is a block diagram of the property supervisory control system of the present invention.
Figure 3:
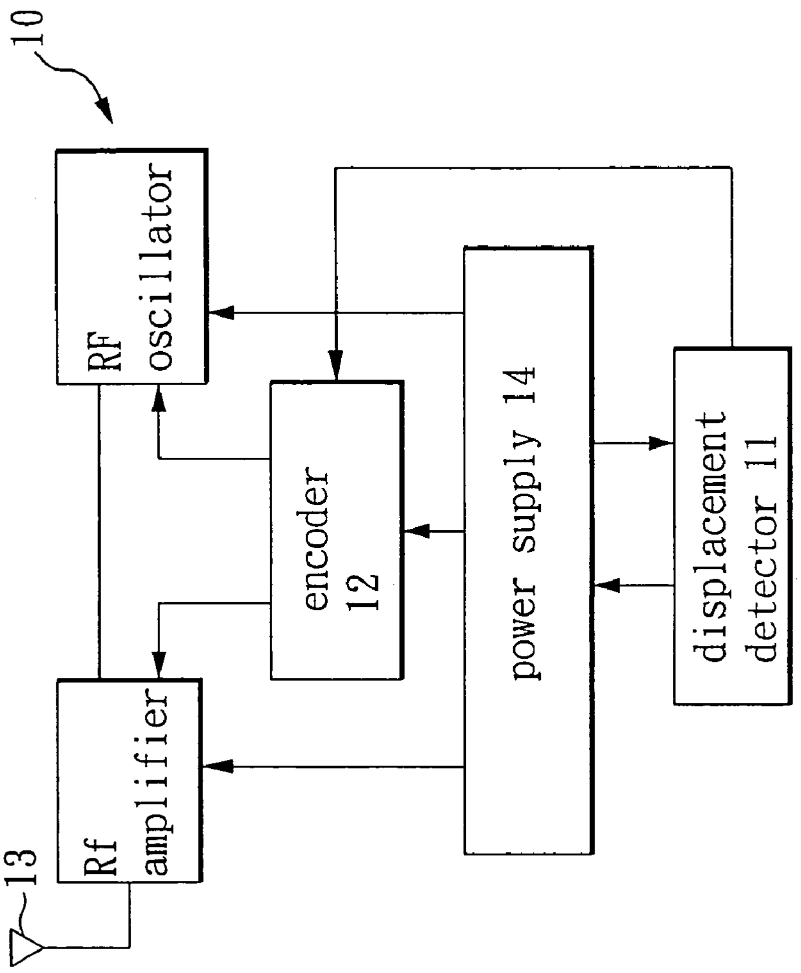
FIG. 3 is a block diagram of a wireless emitter of the property supervisory control system of the present invention.

FIG. 1 shows an operating environment of an embodiment of a property supervisory control system of the present invention. FIG. 2 is a block diagram of the property supervisory control system of the present invention. In the embodiment, the property supervisory control system includes a wireless emitter 10 and a signal processor 20. The wireless emitter is attached to an object 70, and the size of the wireless emitter is preferred to be the same as the size of a CF card. As shown in FIG. 3, the wireless emitter includes a displacement detector 11, an encoder 12, an emitting circuit 13, and a power supply 14. The encoder 12 defines a code name of the object 70, wherein the object 70 could be a work of art, and the code name of the object 70 could be defined by a user. When the object 70 is moved, the displacement detector 11 can detect the movement of the object 70, whereafter the displacement detector 11 starts the power supply 14 to drive the encoder 12 for transmitting the code name of the object by the emitting circuit 13. In the present embodiment, the displacement detect 11 would not be activated when no observed object is moved in the observing region of the displacement detector 11, and thus, the power life of the battery of the wireless emitter 10 could be extended. Furthermore, the displacement detector 11 can further define a predetermined distance, for example 10 cm. When the length of the displacement of the object 70 is longer than the predetermined distance, the code name of the object 70 is transmitted by the wireless emitter 10. An advantage of the predetermined distance is to prevent the displacement detector 11 from being erroneously activated resulted from unavoidable shaking which may be a result the security service personnel's mistake.

Figure 4:
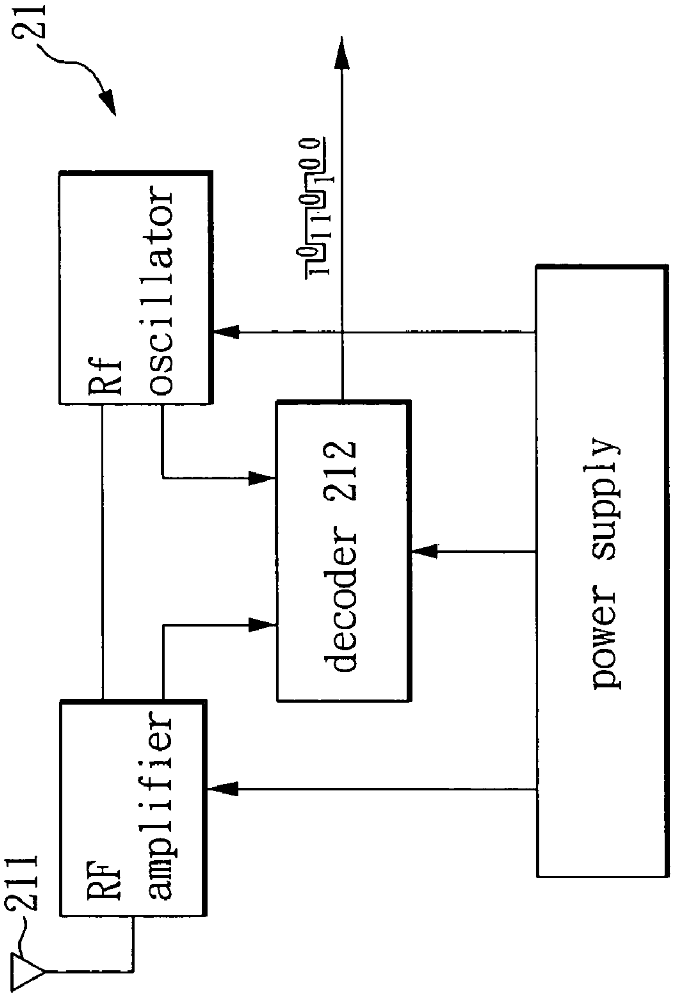
FIG. 4 is a block diagram of a wireless receiver of the property supervisory control system of the present invention.

In the present embodiment, the signal processor 20 is attached to an image capturing device 30, wherein the image capturing device may be a video camera or other image capturing means. The signal processor 20 includes a wireless receiver 21, a central processor 22, an image synthesizer 23, and a power supply 24, as shown in FIG. 4. The wireless receiver 21 includes a receiving circuit 211 and a decoder 212. When the wireless receiver 21 receives the code name from the wireless emitter 10, the decoder 212 decodes the code name and outputs a digital data regarding the object 70, for example a digital data recoded as "01011010" which is capable of being processed by the central processor 22. Moreover, when the central processor 22 receives decoded signals, the central processor proceeds different executions according to different decoded signals. For instance, when the decoded signal includes all the information to identify the object 70, a warning command is transmitted to the image synthesizer 23. In addition, the property supervisory control system further includes an alarm 201 attached to the image capturing device 30. When the central processor 22 transmits a warning command corresponding to the object 70 to the image synthesizer 23, an alarm signal is simultaneously transmitted to start the alarm 201. The alarm may be a buzzer or a lamp signal. As mentioned above, when the object 70 is unusually moved, the alarm can generate a warning signal immediately to prevent the object 70 from being stolen.

Figure 5:
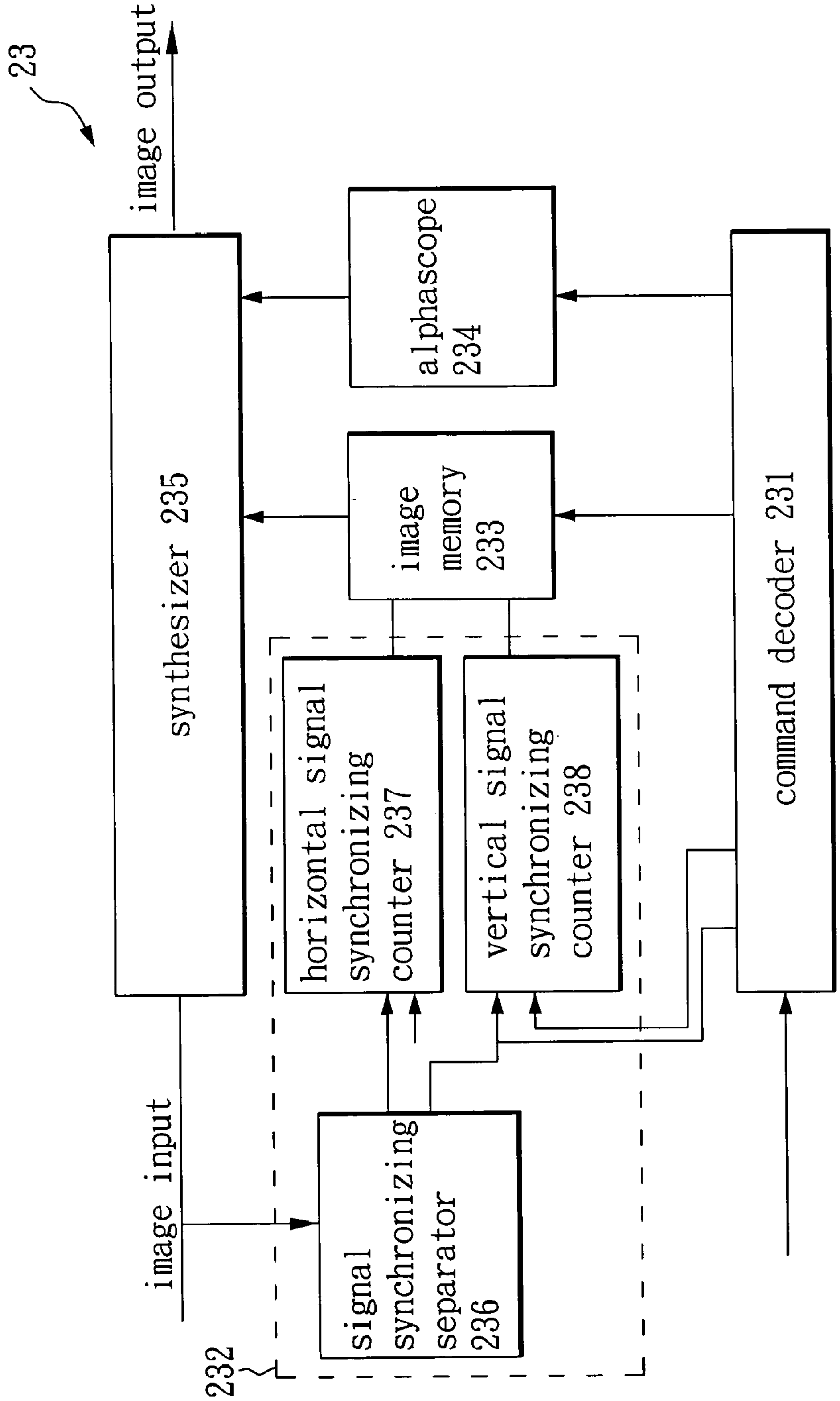
FIG. 5 is a block diagram of an image synthesizer of the property supervisory control system of the present invention.

In the present embodiment, as shown in FIG. 5, the image synthesizer 23 is capable of receiving the image from the image capturing device 30 and the warning command from the central processor 22. The image synthesizer 23 includes a command decoder 231, an image counter 232, an image memory 233, an alphascope 234, and a synthesizer 235. The command decoder 231 unscrambles the warning command transmitted by the central processor 22. The alphascope 234 generates a text according to the warning command unscrambled by the command decoder 231, wherein the image counter 232 records the text including a coordinates value (X,Y) displayed in the image memory 233. For instance, the text may be displayed as that one work of art has been unusually moved. The image counter 232 includes a signal synchronizing separator 236, a vertical signal synchronizing counter 237, and a horizontal signal synchronizing counter 238 to receive, synchronize, and calculate the image signal from the image capturing device 30. The synchronized image signal is stored in the image memory 233. Hence, the synthesizer 235 generates a combination image of the text and the image recorded by the image capturing device according to the coordinate value in the text and transmits the combination image to the supervisory control center.

Figure 6:
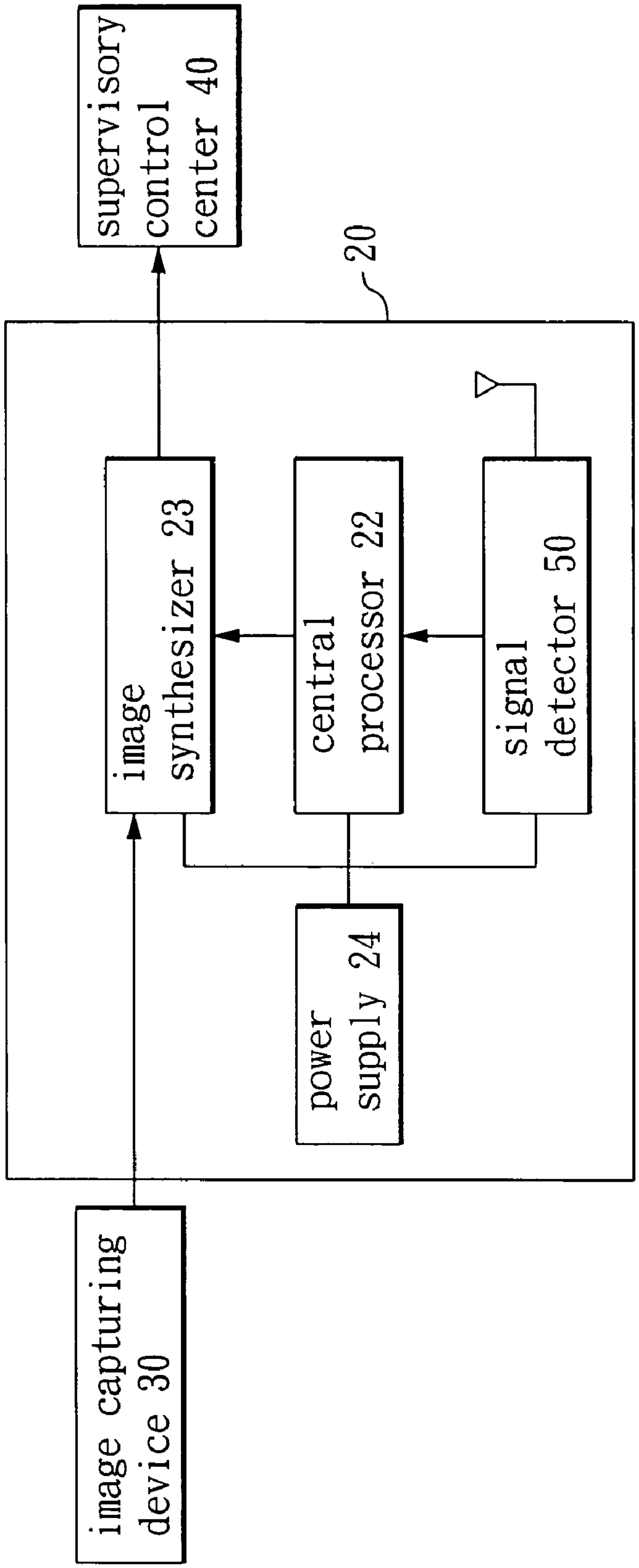
FIG. 6 is a block diagram of a property supervisory control system of another embodiment of the present invention.
Figure 7:
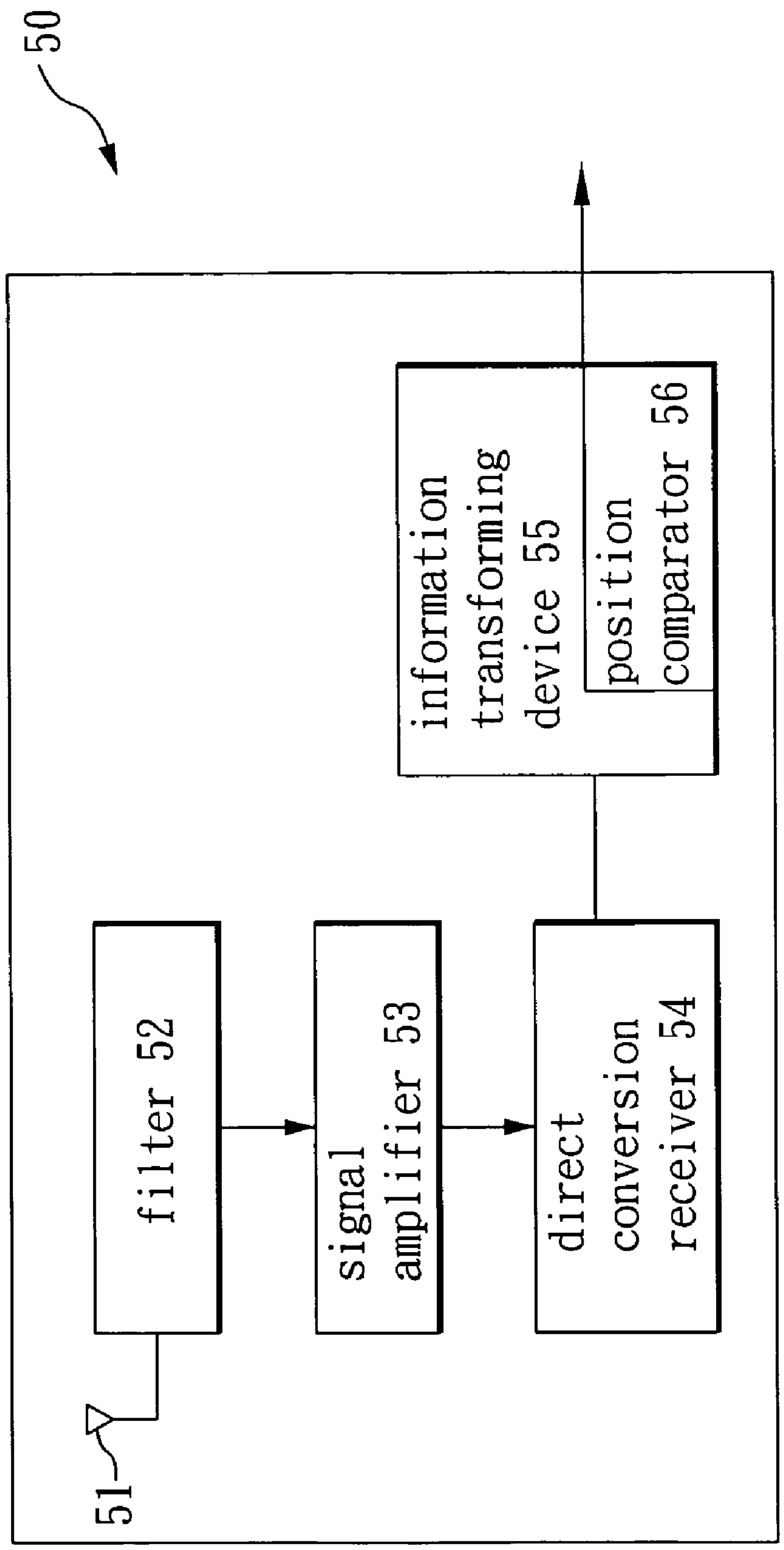
FIG. 7 is a block diagram of a signal detector of the property supervisory control system of the present invention.

As shown in FIG. 6, the wireless receiver 21 may be a signal detector 50 to detect whether there is abnormal signal input. FIG. 7 shows a block diagram of the signal detector 50. The signal detector 50 includes a radio frequency receiver (RF receiver) 51, a filter 52, a signal amplifier 53, a direct transforming receiver 54, and an information transforming device 55, wherein the RF receiver 51 receives an external radio frequency signal (RF signal). The filter 52 filters the external RF signal and transmits the RF signal to the signal amplifier 53 to execute the signal amplifying process. Moreover, the direct transforming receiver 54 receives the RF signal amplified by the signal amplifier and transforms the RF signal amplified into a base band signal. In the present embodiment, the information transforming device includes a position comparator 56, wherein the base band signal is transmitted to the position comparator 56 and compared with a predetermined distance. When the base band signal is larger than the predetermined distance, the base band signal is further transmitted to the central processor to control the image synthesizer 23 generating and transmitting the combination image to the supervisory control center 40.

Figure 8:
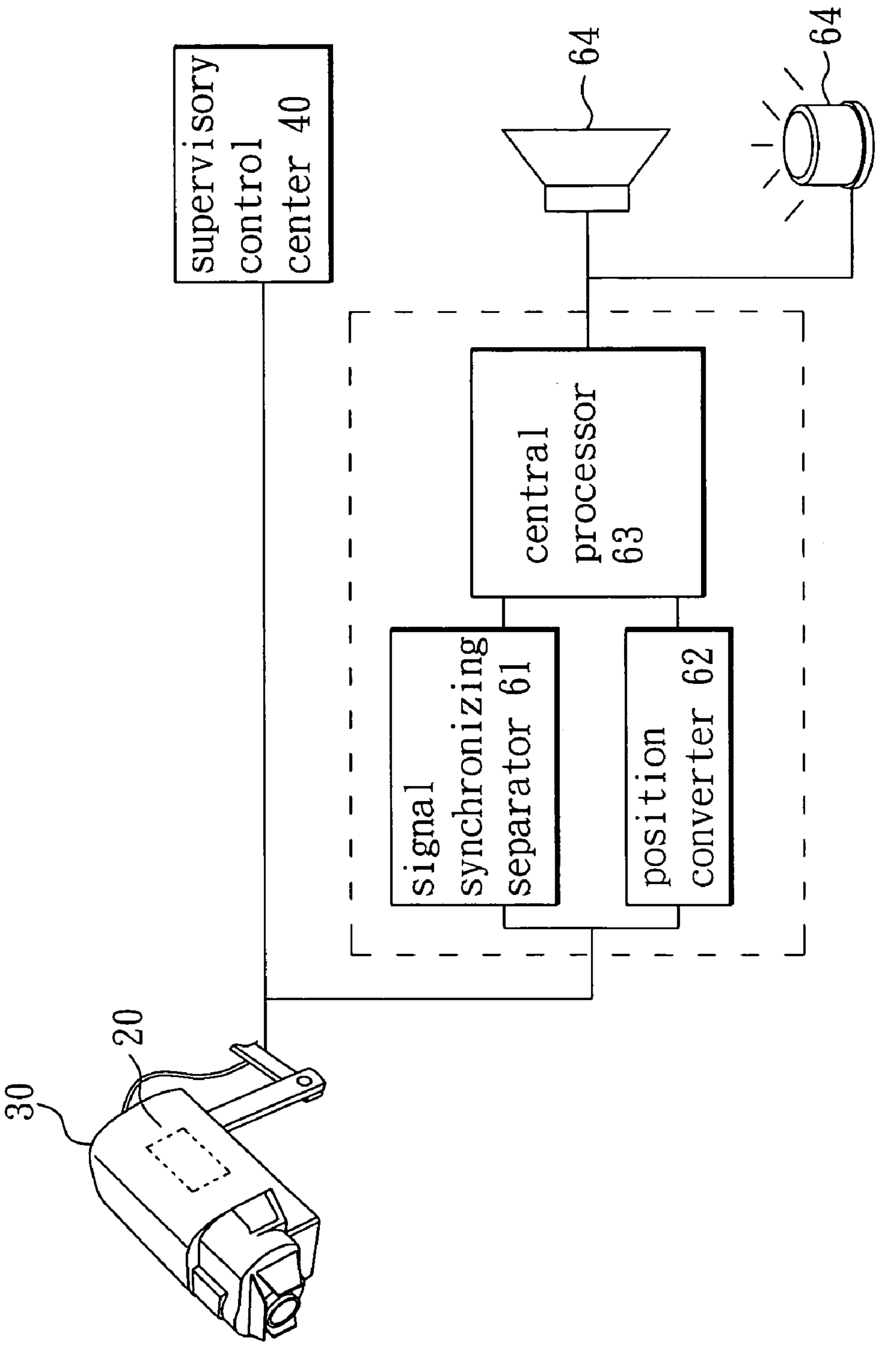
FIG. 8 is a block diagram of an alarm-checking device of the property supervisory control system of the present invention.

Furthermore, as shown in FIG. 8, the property supervisory control system further includes an alarm checking device 60 for receiving the combination image. The alarm checking device includes a signal synchronizing separator 61, a position converter 62, and a central processor 63. The signal synchronizing separator 61 synchronously transmits the combination image to the central processor 63. The position converter 62 detects the moving distance of the object 70 according to the strength of the signal emitted by the wireless emitter. When the central processor 63 deems the combination image outputted by the image synthesizer 23 as an abnormal signal according the output of the signal synchronizing separator 61 and the position converter 62, the central processor 63 transmits a warning signal to start an alarm 64. The alarm may be a buzzer or a lamp signal. The security service personnel 40, therefore, can be notified with the audio alarm signs and can execute emergency processes immediately.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. A property supervisory control system operating with an image capturing device, combining and outputting a warning signal and image record by said image capturing device to a supervisory control center, comprising:

a wireless emitter attached to an object and including a displacement detector, an encoder defining a code name of the object, an emitting circuit, and a power supply, wherein said displacement detector is started, and said power supply drives said encoder to output said code name by said emitting circuit when said objected is moved; and a signal processor attached to said image capturing device including:

a wireless receiver having a receiving circuit to receive said code name from said wireless device, and a decoder to decode said code name;

a central processor receiving said code name decoded by said decoder and transmitting a warning command according to said code name decoded by said decoder, and an image synthesizer receiving said image from the image capturing device and said warning command from said central processor, said image synthesizer including a command decoder, an image counter, an image memory, an alphascope, and a synthesizer, wherein said command decoder unscrambles said warning command, said alphascope generates a text according to said warning command unscrambled by said decoder, said image counter records said text including a coordinates value displayed in said image memory, and said synthesizer generating a combination image of said text and said image recorded by said image capturing device according to said coordinate value in said text and transmits said combination image to said supervisory control center.

2. The property supervisory control system of claim 1 further comprising an alarm checking device for receiving said combination image, said alarm checking device including a signal synchronizing separator, a position converter, and a central processor, wherein said central processor transmits an alarm signal to start an alarm when said central processor determines an usual condition by said signal synchronizing separator and said position converter inspecting said combination image as an unusual condition.

3. The property supervisory control system of claim 2, wherein said position converter further estimates the displacement of said object.

4. The property supervisory control system of claim 2, wherein said alarm is a buzzer.

5. The property supervisory control system of claim 2, wherein said alarm is a lamp signal.

6. The property supervisory control system of claim 1, further comprising an alarm, wherein said central processor simultaneously transmits a warning command and an alarm signal to start said alarm.

7. The property supervisory control system of claim 6, wherein said alarm is a lamp signal.

8. The property supervisory control system of claim 6, wherein said alarm is a buzzer.

9. The property supervisory control system of claim 1, wherein the wireless receiver is a signal detector including:

a radio frequency receiver receiving a external radio frequency signal;

a filter to filter said external radio frequency signal;

a signal amplifier receiving and processing said radio frequency signal filtered by said filter;

a direct transforming receiver for receiving said radio frequency signal amplified by said signal amplifier and transforming said radio frequency signal amplified by said signal amplifier into a base band signal;

an information transforming device including a position comparator, wherein said base band signal is transmitted to the position comparator and compared with a predetermined distance, said base band signal is further transmitted to said central processor to control said image synthesizer generating and transmitting the combination image to said supervisory control center.

10. The property supervisory control system of claim 1, wherein the displacement detector defines a predetermined distance, and the code name is outputted when the length of said displacement of said object is longer than said predetermined distance.

11. The property supervisory control system of claim 1, where the size of the wireless emitter is identical to the size of a CF card.

* * * * *